Patented Apr. 16, 1929.

1,709,734

UNITED STATES PATENT OFFICE.

LEOPOLD OSWALD, OF BASEL, SWITZERLAND, ASSIGNOR TO THE FIRM J. R. GEIGY S. A., OF BASEL, SWITZERLAND.

MANUFACTURE OF AZO-DYESTUFFS.

No Drawing. Application filed July 14, 1927, Serial No. 205,849, and in Germany July 29, 1926.

Monoazo-dyestuffs made from aromatic amines sulphonated in ortho-position are known which have very good properties, such as beauty of tint and satisfactory fastness to light. For instance the dyestuff lake-red C (Schultz, Farbstofftabellen 1914, No. 153), made by coupling diazotized 1-methyl-2-chloro-5-amino-4-benzene sulphonic acid with beta-naphthol, is a valuable commercial dyestuff.

The dyestuff made by coupling diazotized 2 chloro-5-amino-4-sulpho-1-benzoic acid with beta-naphthol, that is to say a dyestuff differing from lake-red C in that the carboxyl group is substituted for the methyl group, is not only of purer tint than lake-red C but excels that dyestuff in its fastness to light. Similar advantages as compared with dyestuffs from non-carboxylated amino-ortho-sulphobenzene are to be found in the dyestuffs derived from all amino-sulpho-benzoic acids whether they contain halogen as substituent or not, provided that the amino-group is in ortho-position to the sulpho-group.

The invention relates to the manufacture of monoazo-dyestuffs by coupling a diazotized aminosulphobenzoic acid in which the sulpho-group is in ortho-position to the amino-group with a usual coupling component. Of the amino-sulpho-benzoic acids which are used in this invention the valuable mono-chloro-substitution products have not hitherto been made. 2-chloro-5-amino-4-sulpho-1-benzoic acid can be made by oxidizing the ortho-chloro-para-toluenesulphonic acid, nitrating the carboxylic acid thus produced in concentrated sulphuric acid by means of nitrating acid and then reducing the product. The acid alkali salts of the acid are colourless crystalline powders, very sparingly soluble in cold water. The diazo-compound of the acid is colourless and sparingly soluble. Quite similar in properties is the 2-chloro-4-amino-5-sulpho-1-benzoic acid produced by sulphonating ortho-chloro-para-nitro-toluene, then oxidizing to produce the carboxylic acid and subsequently reducing.

The following examples illustrate the invention:—

Example 1.

300 litres of a solution containing 25.2 kilos of 2-chloro-5-amino-4-sulpho-1-benzoic acid are diazotized in the usual manner with 6.9 kilos of sodium nitrite at 15° C. and then coupled in neutral or feebly acid solution with 14.5 kilos of beta-naphthol. When coupling is complete the temperature is raised to 60° C., the precipitate is dissolved with aid of sodium carbonate. The whole is filtered and the dyestuff precipitated from the filtrate by addition of common salt, then filtered and dried. The dyestuff is a fiery red powder, soluble in cold water to an orange solution and in concentrated sulphuric acid to a magenta red solution. The calcium or barium lake of this dyestuff has the advantage over lake-red C in that its tint is more fiery and it has a better fastness to light.

The dyestuff may be represented by the following formula:

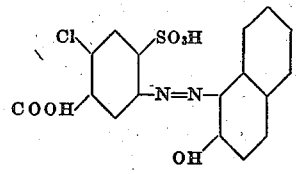

Example 2.

The quantity of diazo-compound made as described in Example 1 is coupled in known manner in solution feebly acid with a mineral acid with 23.9 kilos of 2-amino-8-naphthol-6-sulphonic acid; when the coupling is complete the whole is made feebly alkaline with sodium carbonate and the dyestuff is precipitated by addition of common salt.

The dyestuff is a dark red powder, easily soluble in water to a dark red solution and in concentrated sulphuric acid to a dirty Bordeaux red solution. It dyes wool in a sulphuric acid bath bluish red, vivid tints or remarkable fastness to light. By after-chroming the tint is only slightly changed, while the fastness is considerably improved.

The dyestuff may be represented by the following formula:

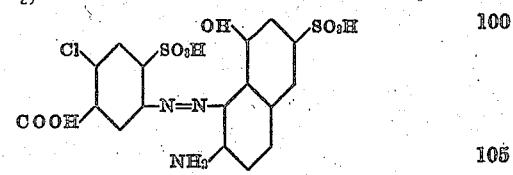

With the usual pyrazolone derivatives dyestuffs are obtained which are characterized by pure greenish yellow to yellow tints of extraordinary fastness to light.

What I claim is:

1. A process for the manufacture of monoazo-dyestuffs, consisting in diazotizing an amino-sulpho-benzoic acid having the sulpho-group in ortho-position to the amino group and coupling the diazo-compound with aryl derivatives having at least one auxochrome group as coupling components.

2. A process for the manufacture of monoazo-dyestuffs, consisting in diazotizing a halogen-amino-sulpho-benzoic acid having the sulpho-group in ortho-position to the amino group and coupling the diazo-compound with aryl derivatives having at least one auxochrome group as coupling components.

3. A process for the manufacture of monoazo-dyestuffs, consisting in diazotizing 2-chloro-5-amino-4-sulpho-1-benzoic acid and coupling the diazocompound with aryl derivatives having at least one auxochrome group as coupling components.

4. A process for the manufacture of monoazo-dyestuffs, consisting in diazotizing 2-chloro-5-amino-4-sulpho-1-benzoic acid and coupling the diazocompound with 2-amino-8-naphthol-6-sulphonic acid.

5. As new articles of manufacture, the monoazo-dyestuffs obtained by diazotizing an amino-sulpho-benzoic acid having the sulpho-group in ortho position to the amino group and coupling the diazo-compound with aryl derivatives having at least one auxochrome group as coupling components, and constituting fiery red to dark red powders, soluble in water and concentrated sulphuric acid, yielding vivid dyes of remarkable fastness to light.

6. As new articles of manufacture, the monoazo-dyestuffs obtained by diazotizing 2-chloro-5-amino-4-sulpho-1-benzoic acid and coupling the diazo compound with aryl derivatives having at least one auxochrome group as coupling components, and constituting fiery red to dark red powders, soluble in water and concentrated sulphuric acid, yielding vivid dyes of remarkable fastness to light.

In witness whereof I have hereunto signed my name this 1st day of July, 1927.

LEOPOLD OSWALD.